April 25, 1961 G. F. SPRAGENS 2,981,523
CONTINUOUS MIXING AND JET DISCHARGE APPARATUS
Filed July 16, 1959 2 Sheets-Sheet 1

INVENTOR
GEORGE F. SPRAGENS
BY W. E. Sherwood
ATTORNEY

April 25, 1961  G. F. SPRAGENS  2,981,523
CONTINUOUS MIXING AND JET DISCHARGE APPARATUS
Filed July 16, 1959  2 Sheets-Sheet 2
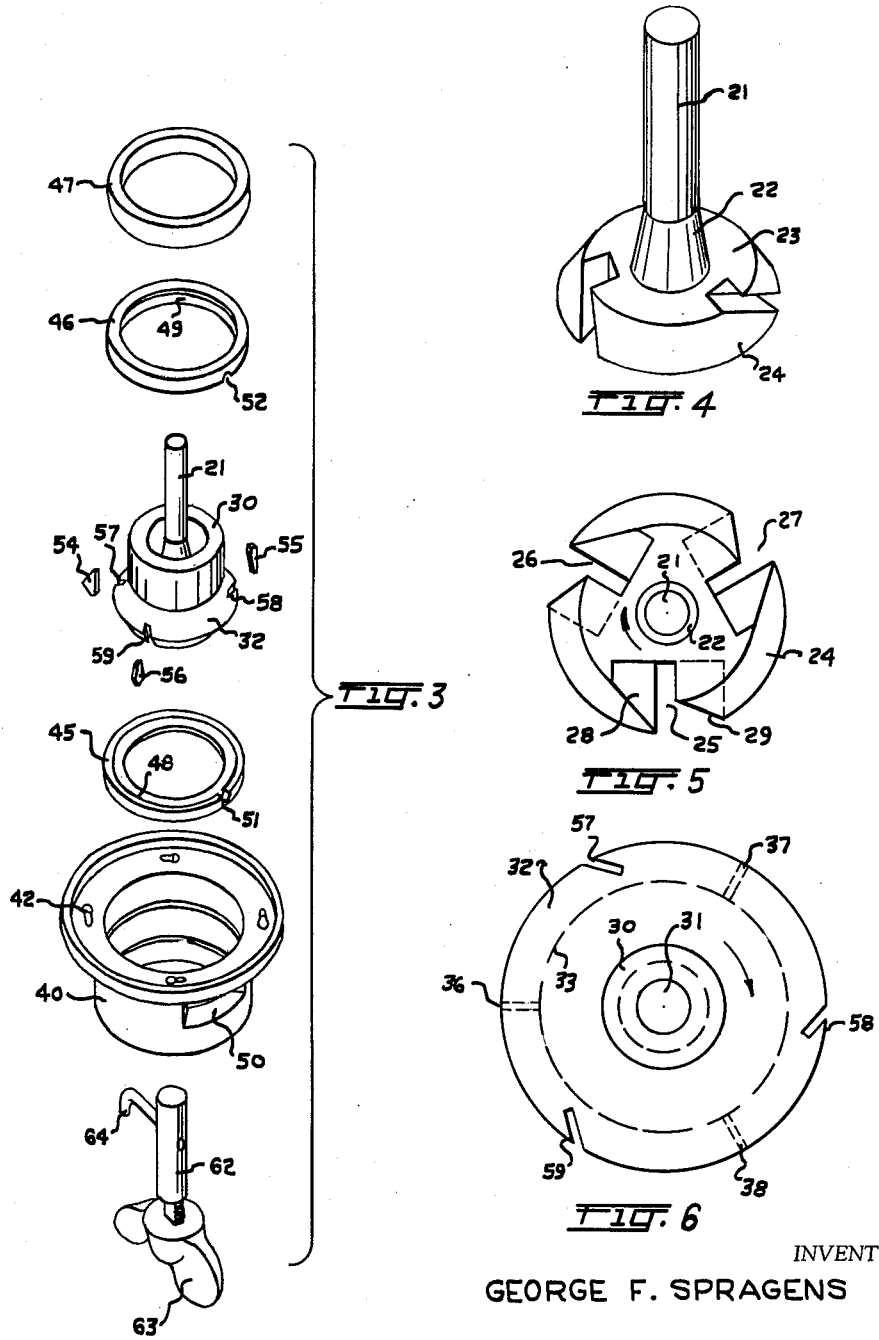
INVENTOR
GEORGE F. SPRAGENS
BY W. E. Sherwood
ATTORNEY

United States Patent Office 2,981,523
Patented Apr. 25, 1961

2,981,523

CONTINUOUS MIXING AND JET DISCHARGE APPARATUS

George F. Spragens, 7608 La Grange Road, Lyndon, Ky.

Filed July 16, 1959, Ser. No. 827,540

13 Claims. (Cl. 259—3)

This invention relates to an improved continuous mixing apparatus and more particularly to a mixing apparatus from which the mixed materials may be discharged without entailing significant overspray losses.

As disclosed in my copending application, Serial No. 796,308, filed March 2, 1959, certain unusual problems are encountered in the mixing of the ingredients employed in the manufacture of plastic foams and the apparatus therein disclosed is particularly well suited for plastic foam manufacture when the stream of mixed liquids is to be directed to a point of deposit by gravity. Although the present invention may also be used for depositing mixed materials by gravity, it is especially suited to the ejecting of the materials from the mixing apparatus under pressure and in the form of a jet discharge which has a trajectory extending an appreciable distance from the mixing apparatus.

For example, in the coating of certain structures, such as furniture, with flexible plastic foams, a requirement exists for an apparatus which may be held at differing locations with respect to the structure being coated and from which the foam material may be propelled with other than a gravity discharge. Various forms of apparatus to accomplish this purpose have been proposed, but so far as I am aware, all such equipment has been subject to one or more disadvantages, which it is a purpose of my invention to overcome.

When compressed air is used in an internal mixing spray gun, for instance, not only is a problem of cleaning of the apparatus involved, but also a high degree of overspray loss is found. The air stream which entrains the mixed materials and carries them from the mixing section has a tendency to hit the surface on which the material is being applied and to bounce, thus carrying an appreciable portion of the material with it and causing the spray loss.

As is known, a particularly difficult mixing problem is involved in the mixing of materials from which plastic foams, particularly of the polyurethane and isocyanate types, are to be produced. These foams are produced by mixing two or more liquids, one of which will contain a polyether or polyester resin and the other of which contains a catalyst. Thickening or stiffening agents may also be employed to assist in depositing the mixed material without splattering. A common mixture for flexible polyurethane foams, moreover, may require greatly unequal amounts of liquids of different viscosities for example, as much as 97% of a high viscosity liquid to be mixed with only about 3% of a low-viscosity liquid. In such cases, when using conventional mixing spray guns, not only is a uniform mixing and discharge difficult to secure, but also, due to the air present, excessive evaporation of the low-viscosity liquid may occur.

The chemical reaction between the foam ingredients begins as soon as such liquids are combined, thus rendering it essential that the properly mixed ingredients be discharged from the mixing structure immediately after the mixing is completed. In general, a typical mixing may be concluded in 1–3 seconds and the mixed materials will undergo complete foam expansion in the succeeding 2–3 minutes and thereafter will set or harden in the succeeding few minutes. In view of this behavior of the materials, the mixing apparatus must be capable of being cleaned promptly after use and must not contain surfaces on which material can set or harden while in use.

It is a purpose of this invention therefore to provide an apparatus which will satisfy mixing and discharging requirements of the character above indicated, but which also is suitable for other general mixing usages without being limited to the handling of plastic foams.

An object of the invention is to provide an improved continuous mixing apparatus having a jet discharge therefrom.

Another object is to provide an improved continuous mixing apparatus which may be manually held in varying positions for discharging the mixed materials in differing directions therefrom.

A further object is to provide an improved self-cleaning mixing and discharging apparatus.

A still further object is to provide an improved continuous mixing apparatus having a jet discharge therefrom and including a selective amount of stirring without interference with the discharge from the apparatus.

Other objects and advantages will become more apparent as the description proceeds and when considered in conjunction with the accompanying drawings in which:

Fig. 3 is an exploded view of coacting elements employed in the mixing and jet discharge of the mixed material.

Fig. 4 is a perspective view of a chamber-defining member for use with the rotatable mixing receptacle.

Fig. 5 is a plan view of the member shown in Fig. 4, and

Fig. 6 is a plan view of the mixing receptacle.

In accordance with the invention there is provided a portable mixing and discharging structure containing a high speed motor, and flexible supply lines for material to be mixed and leading into the structure. The motor drives a hollow mixing receptacle having interior surfaces causing the material to move toward a discharge aperture in that receptacle. Surrounding the periphery of the receptacle is a casing receiving mixed material from the aperture in the receptacle and itself having an orifice through which that material may be discharged. Blades carried by the rotatable receptacle scrape material from the inner surface of the casing and pump it into the discharge orifice with sufficient pressure to form a jet of such material. The receptacle preferably is open at each end so as to avoid entrainment of air in the mixed materials and also may have an adjustable member at the lower end of the receptacle for selectively stirring the mixed materials prior to their discharge from the aperture in that receptacle.

Figure 1:
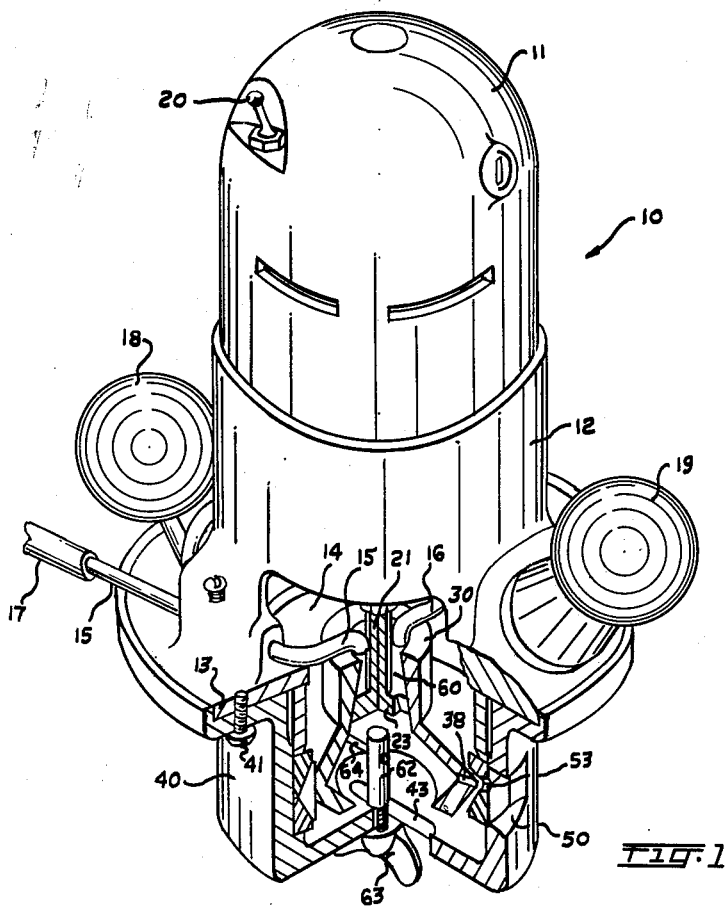
Fig. 1 is a perspective view of a unit embodying the invention and with portions broken away better to show the assembly of the respect internal parts.

Referring now to Fig. 1, a portable unit 10 which is adapted for manual handling is shown as representing one embodiment of the invention, although in its broader aspects the invention may be employed in movable units manipulable by other than manual means, or even in stationary units to which the mold to be filled, or object to be coated may be transported. The unit may employ a conventional high-speed electric motor 11 which conveniently may be of a series wound type having a variable resistor for speed control, or may use any other equivalent prime mover capable of carrying out the motor functions later to be described. In any event, the prime mover is suitably mounted within a housing 12 having a base plate, portion 13 including a central aperture 14 therein. By means of hollow bosses formed in the housing, a plurality of short conduits, here shown as two at 15 and 16, are removably mounted upon the housing, as by means of set screws. At one end these short conduits are arranged to discharge into the apparatus through aperture 14 and at their other end are connected to suitable flexible supply lines through which the liquid ingredients are supplied, one such supply line being indicated at 17. At their ends discharging into the apparatus these short conduits are suitably curved and extended downwardly so as to deposit material well below the uppermost edge of the wall of the upper chamber 60, later to be described. The apparatus is, of course, adapted for operation when tipped to appreciable angles from the vertical. The supply lines, moreover, are sufficiently long and have sufficient slack to enable the user to manipulate the unit freely in many differing positions.

It will be understood that these ingredients are supplied under pressure from suitable supply reservoirs under valve controls (not shown) and that the throughput of the unit, the speed of the prime mover, and the size of the several component parts later to be described, are all related to each other to the end that a given unit will possess a rated capacity for mixing and discharging a particular material. Handle means 18 and 19 are provided for manipulating the unit and a convenient switch 20 is provided for stopping and starting the motor, which is, of course, equipped with electrical leads (not shown) having sufficient length and slack to permit the manipulation of the unit.

Projecting through aperture 14 and connected to the prime mover is a shaft 21 forming the stem portion of a chamber-defining means best shown in Fig. 4 and serving to support and to drive a rotatable hollow mixing receptacle. This stem portion preferably is enlarged into a generally conical portion 22 to which is joined a plate portion 23 herein called the transfer plate. At its periphery the transfer plate has bevelled edge 24 preferably conforming to the slope of the inner wall of the receptacle and adapted to fit snugly thereagainst. Adjacent its periphery the transfer plate is provided with a plurality of apertures or slots here shown at 25, 26, and 27, each of which has a leading edge 28 and a trailing edge 29 and with a taper which extends opposite to the normal direction of rotation of the receptacle. Thus, the movement of the transfer plate under the material contained thereabove serves to effect a smooth and relatively uniform flow of material from above to beneath that plate.

Figure 2:
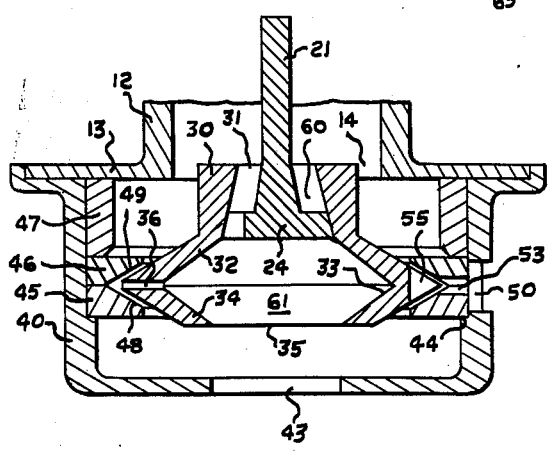
Fig. 2 is a sectional view taken diametrically of the mixing receptacle assembled within the casing and with the selective stirring member removed.

Referring now to Fig. 2, the transfer plate is rigidly attached by any suitable means to the mixing receptacle and serves to drive that receptacle. The receptacle includes an upstanding wall portion 30 having an open end 31 through which the stem 21 projects and into which the contents of conduits 15 and 16 are discharged. The inner surface of the wall 30 has a slope, preferably the same as that of the edge 24 of the plate, and of increasing diameter in the direction of material flow. However, below the transfer plate the uppermost wall 32 of the receptacle is formed with a greater slope in the direction of material flow and extending to a circular peripheral zone 33. From this zone the receptacle has a reversely sloping wall 34 terminating in a lower open end 35. Formed within the receptacle and communicating with the zone 33 on the interior of the receptacle are one or more small apertures, here shown at 36, 37 and 38 through which mixed material is forced by centrifugal action.

As seen in Figs. 1 and 3 showing the manner in which the unit may be assembled and disassembled, a cup-shaped casing 40 is adjustably mounted upon the plate 13 as by means of suitable screws 41 engaging in slots 42, and when so mounted is in surrounding relation to the periphery of the receptacle. Within the bottom of the casing a slot 43 is provided for the dual purpose of mounting the selective stirring means later to be described and for assisting in venting the interior of the unit. A shoulder 44 in the inner wall of the casing serves to mount a lower material-directing ring 45. Resting upon this ring in juxtaposed position thereto is an upper material-directing ring 46 which in turn is held in place by an annular spacer 47 engaging with the bottom of plate 13 on the housing.

As a significant feature, the lower and upper rings contain bevelled symmetrical surfaces 48 and 49, respectively, facing each other and disposed closely adjacent the sloping outer walls of the receptacle at its greatest periphery. The space between such surfaces and those walls is commensurate with the throughput capacity of the unit. At one side the casing is provided with a relatively large aperture 50 and through which the jet of mixed material is propelled. Moreover, the lower ring 45 and the upper ring 46 are provided respectively with complementary mating semi-cylindrical recesses 51 and 52 extending through the peripheral walls of those rings and jointly serving as a tangentially directed discharge orifice 53 (Figs. 1 and 2). The dimension of this orifice likewise is commensurate with the capacity of the unit, a diameter of ⅛ inch having been found to be satisfactory in the mixing of foam material when a trajectory of two feet is desired and with a material flow rate of about one-half pound per minute.

Considering now Figs. 3 and 6, the outer periphery of the receptacle opposite the inner mixing zone 33 is provided with one or more pumping blades here shown at 54, 55 and 56. These blades are adapted to rest in slots 57, 58 and 59 cut into the periphery of the receptacle and facing preferably, but not necessarily, opposite to the direction of rotation thereof. While various forms and mountings of such blades may be used, I prefer to employ small triangular shaped blades, such as seen at 55 in Fig. 2, and which are loosely mounted so as to be self-seating. Preferably, the blades are formed of a material such as a plastic which will not cause excessive wear on the material-directing rings.

With the foregoing description in mind and considering, as an example, the use of the apparatus in the manufacture and depositing of a flexible plastic foam, the liquid, containing the resin when supplied by conduit 15 will thus fall into the upper chamber 60 within the receptacle and splash upon the rotating plate 24 which defines not only that upper chamber but also a lower chamber 61 below the plate. At the same time centrifugal forces cause the incoming liquid to be thrown outwardly against the sloping inner wall of the upper chamber 60 and the conical portion 22 of the stem of shaft 21 opposes any tendency of the liquid to move upwardly of that shaft during rotation. Similarly, the liquid containing the catalyst and passing from conduit 16 will drop into upper chamber 60 and partake of the same motion even through the liquids may be of greatly differing viscosities and proportions. Accordingly, a uniform distribution of these materials is secured and with these materials continuously flowing over one another in sheet-like form as they move along the rotating surfaces.

Thus, as the materials reach the region of the transfer slots they are promptly transferred to the upper part of sloping wall 32 in the lower chamber 61 under centrifugal force and move as intermingled sheets toward the peripheral collecting zone 33. Due to the reverse slope of wall 34, the mixed material collected in this zone does not move toward the open end 35 of the receptacle, but rather collects in a pool from which it discharges through the apertures 36, 37, and 38. It further will be noted that the transfer slots, the open ends of the receptacle, and the aperture 14 in the housing permit air to circulate freely in the apparatus and that the liquids under centrifugal force thus displace any air present and do not entrain such air in the liquid itself. In this way, a more uniform final product is produced and with reduced evaporation of liquids.

In handling materials wherein supplemental mixing or stirring is desirable, the invention provides a convenient means for accomplishing this purpose, as best seen in Figs. 1 and 3. A simple support member 62 threaded at one end for reception of a thumbscrew 63 and engaging in the slot 43 of the casing, may be used. Affixed to the support is a suitable stirrer element 64 adapted to project a greater or lesser distance into the pool of mixed liquids collected in zone 33. Thus, by moving the support lengthwise of the slot, a selective supplemental stirring may be accomplished in the pool of material awaiting discharge from the receptacle. It will be understood that various shapes of stirrer elements may be used for serving as a baffle and which are so shaped with respect to the direction of rotation of the receptacle that material is prevented from moving centripetally toward the support member 62.

As mixed material passes through the discharge apertures of the receptacle it is initially confined within the space bounded by the bevelled surfaces of the material-directing rings and the outer walls of the periphery of the rotating receptacle, it being understood that such material is under substantial pressure. Immediately, this material is engaged by the pumping blades of the rotating receptacle and driven at high speed into the tangentially directed orifice 53 in those rings whereupon it is ejected in the form of a jet stream through the aperture 50 in the casing and is removed laterally from the apparatus. Due to its mass and velocity, the stream remains substantially unbroken until it reaches its point of deposit on the article to be coated or in the mold to be filled. Moreover, due to the continuous supply into and continuous discharge from the mixing receptacle, the stream or jet itself is continuous rather than intermittent.

When mixing the ingredients of the plastic foam in the illustrative use of the invention, the self-cleaning action of the several structural parts is of especial significance; the interior walls and surfaces are such that centrifugal force tends to direct all material first through the discharge apertures in the receptacle and then the blades on the receptacle serve to scrape that discharge material from the material-directing rings into the jet orifice. Thus, by continuing to rotate the mixing receptacle for a short time after the supply of material is cut off, the inner surfaces are cleaned and by means of an induced air flow from the empty rotating receptacle, the discharge orifice 53 itself is cleaned. The unit may be readily disassembled for the purpose of maintenance as when blades 54, 55 and 56 require replacement.

When pouring rather than jet discharge is desired, the same apparatus may be used merely by substituting material-directing rings having a greatly enlarged orifice therein and by permitting the material to drop from the aperture 50 in the casing rather than being ejected under pressure, as described above. In this usage the aperture 50 may be equipped with a funnel like member (not shown) to guide the discharged material leaving the apparatus.

Various advantages of the invention will now be apparent to those skilled in the art. Since no compressed air is employed as a transporting agent, the likelihood of overspray loss is substantially eliminated. The apparatus itself may be manipulated in many different positions, being restricted essentially to only those positions in which liquids entering from conduits 15 and 16 are able to enter the upper chamber 60 of the receptacle without spilling over the side of wall 30. Accordingly, the wide range of manipulation permitted will allow the user efficiently to direct the jet of mixed material against surfaces other than those arranged in horizontal planes.

While a particular embodiment of my invention has been shown, it will be understood, of course, that I do not wish to be limited thereto, since many modifications can be made; and I, therefore, contemplate by the appended claims to cover any such modifications as fall within the true spirit and scope of my invention.

What is claimed is:

1. In a continuous mixing apparatus, a rotatable hollow mixing receptacle open at each end, means for driving said receptacle, a casing surrounding the periphery of said receptacle, said casing having an open portion at the lower end thereof communicating with the open lower end of said receptacle, means for supplying a plurality of materials into said receptacle through the upper open end thereof for mixing therein, means defining an upper and a lower chamber within said receptacle and including apertures connecting said chambers, said supplying means serving to direct incoming material into said upper chamber, an aperture in the wall of said lower chamber for discharge of mixed material therefrom laterally of said receptacle, an aperture in said casing for receiving material discharged from said receptacle and for removing the same from said apparatus, and blade means carried by said receptacle and cooperating with said casing for propelling material discharged from said receptacle into said aperture in said casing.

2. Apparatus as defined in claim 1 wherein said chamber-defining means forms a part of said means for driving said receptacle.

3. Apparatus as defined in claim 1 including stirring means mounted upon said casing and projecting through the open portion of the lower end of said casing and into the interior of said lower chamber adjacent said aperture in the wall thereof, said stirring means being selectively adjustable thereby to extend a predetermined distance into the mixed material contained in said lower chamber.

4. A continuous mixing and jet discharge apparatus comprising a rotatable hollow mixing receptacle open at each end, means for driving said receptacle, a casing surrounding the periphery of said receptacle and containing orifice means for establishing a jet of mixed material discharged from said apparatus, said casing having an open portion at the lower end thereof communicating with the open lower end of said receptacle, means defining an upper and a lower chamber within said receptacle and including apertures connecting said chambers, means for supplying through the open upper end of said receptacle and into said upper chamber below the uppermost edge of the wall thereof materials to be mixed in said receptacle, an aperture in the wall of said lower chamber for discharge of mixed material therefrom laterally of said receptacle, an aperture in said casing for receiving said mixed material discharge and for delivering the same laterally from said apparatus in the form of a jet, said orifice means being directed into said aperture in said casing, and blade means carried by said receptacle and cooperating with said casing and said orifice means for propelling material discharged from said receptacle into said casing aperture in the form of a jet discharge.

5. Apparatus as defined in claim 4 including a portable housing enclosing said driving means and to which said casing is attached.

6. Apparatus as defined in claim 5 including handle means on said housing adapted for manipulation of said apparatus in both at least one vertical and one non-vertical position.

7. Apparatus as defined in claim 4 wherein said receptacle is open at each end and wherein said casing includes an aperture at its top and bottom thereby to permit air within said apparatus to be freely displaced by materials being mixed therein without entrainment of air in said materials.

8. A continuous self-cleaning mixing and jet discharge apparatus comprising a rotatable hollow mixing receptacle open at each end, a casing surrounding the periphery of said receptacle, a pair of material-directing rings disposed in said casing and directing material discharged from said receptacle, said rings having juxtaposed bevelled easily-cleaned surfaces facing toward the periphery of said receptacle, means defining an upper and a lower chamber within said receptacle and including apertures connecting said chambers, means for supplying into said upper chamber materials to be mixed in said receptacle, an aperture in the wall of said lower chamber for discharge of mixed material therefrom and into contact with said rings, an orifice in said rings directed generally tangentially of the periphery of said receptacle, an aperture in said casing for receiving mixed material discharge and for delivering the same laterally of said apparatus, said orifice being directed into said aperture in said casing, and blade means carried by said receptacle and cooperating with said rings to clean the same and to propel material discharged from said receptacle into said casing aperture.

9. Apparatus as defined in claim 8 wherein said apertures in said chamber-defining means have a taper extending opposite the direction of rotation of said receptacle thereby to assist in flowing material from said upper to said lower chamber during rotation of said receptacle.

10. Apparatus as defined in claim 8 wherein said upper chamber includes a sloping wall having an increasing diameter in the direction leading to said second chamber.

11. Apparatus as defined in claim 8 wherein said second chamber includes a sloping wall having an increasing diameter in the direction leading from said first chamber to the periphery of said receptacle and a sloping wall having a diminishing diameter in the direction leading from said periphery to the lower open end portion of said receptacle.

12. Apparatus as defined in claim 8 wherein said blade means comprises a triangular shaped member removably mounted on said receptacle and having two edges engaging the respective bevelled surfaces of said rings as said receptacle is rotated.

13. Apparatus as defined in claim 8 wherein a plurality of spaced apertures are provided in the wall of said lower chamber for discharge of material and a plurality of spaced blade means are provided to propel said discharged material into said orifice.

References Cited in the file of this patent

UNITED STATES PATENTS

| | | |
|---|---|---|
| 1,179,064 | Althoff | Apr. 11, 1916 |
| 1,540,853 | Macfie | June 9, 1925 |

FOREIGN PATENTS

| | | |
|---|---|---|
| 638,966 | Great Britain | June 21, 1950 |
| 655,503 | Germany | Jan. 17, 1938 |